Jan. 25, 1966     R. H. SKIDMORE     3,230,631
OPTICAL CENTER PUNCH
Filed July 11, 1963     2 Sheets-Sheet 1
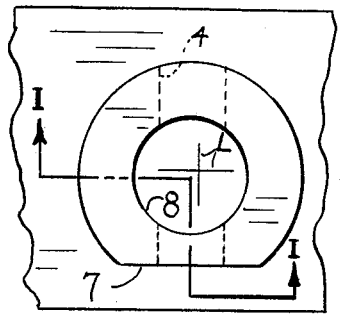
FIG 4
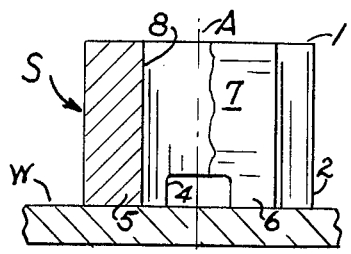
FIG 1
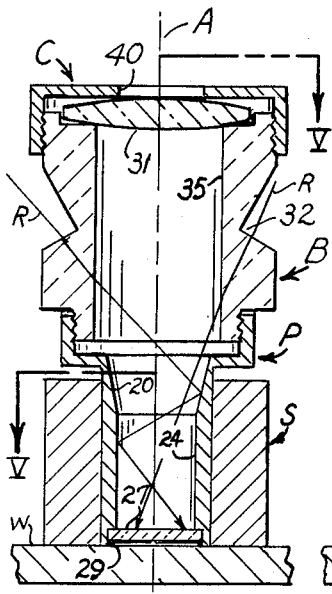
FIG 2
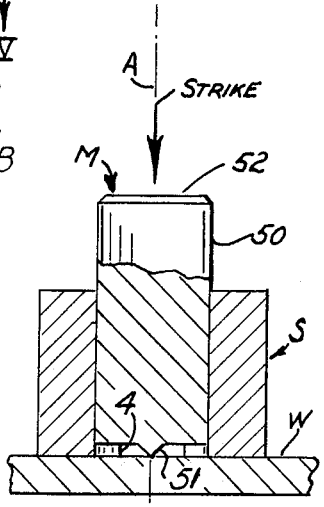
FIG 3
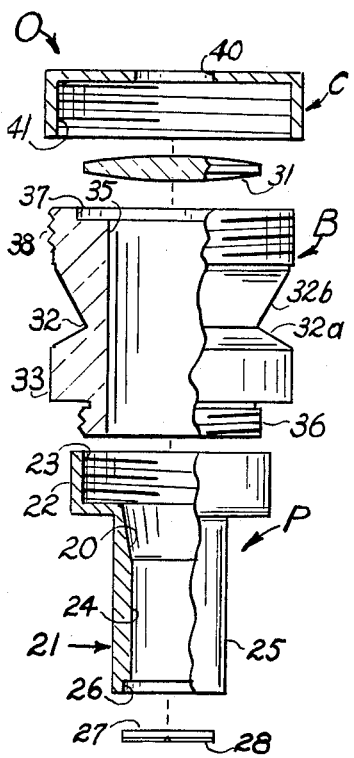
FIG 7
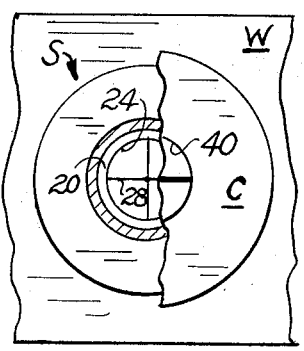
FIG 5
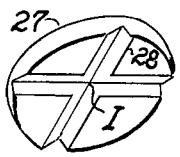
FIG 13
FIG 6
FIG 12
INVENTOR.
RICHARD H. SKIDMORE
BY George B Kasik
ATTORNEY Jan. 25, 1966   R. H. SKIDMORE   3,230,631
OPTICAL CENTER PUNCH Filed July 11, 1963   2 Sheets-Sheet 2

INVENTOR.
RICHARD H. SKIDMORE
BY George B. Kasik
ATTORNEY

United States Patent Office 3,230,631
Patented Jan. 25, 1966

3,230,631
OPTICAL CENTER PUNCH
Richard H. Skidmore, 1144 Brainard Road,
Lyndhurst, Ohio
Filed July 11, 1963, Ser. No. 294,299
7 Claims. (Cl. 33—189)

This invention relates to an instrument for locating and marking a center punch point in tool and die work.

It is an object of this invention to provide a device by which the center point of one or more holes may be accurately determined.

A further object of the invention is to provide an instrument that is readily fabricated, simple to manipulate, highly accurate in operation and that is relatively immune to accidental injury. It is a further object of the invention to provide an instrument that has few movable parts, that can be readily transported and stored and that is light in weight. These latter features are particularly desirable for instruments and tools that are used by the tool and die trade, where such tools are generally stored in a carrying case (with limited space) for convenient transport and safe keeping.

A further important object of the invention is to provide an instrument of the aforesaid class that requires no adjustment or calibration of its parts by the operator before, during or after its use; that is to say, the instrument shall have all of its parts accurately and permanently formed and adjusted at the time of manufacture so no field attention is necessary. Furthermore, it is an advantage of my invention that normal wear from usage shall not affect the accuracy of the instrument. Because of the prefixed relationship of the individual parts and their relative simplicity it will be seen that the invention is capable of use by less experienced or apprentice personnel who, nevertheless, are capable of securing accurate results.

I am aware that the art in the field discloses certain devices which would appear to provide some of the objectives set forth above, but it has been my experience that the prior art has not fulfilled these objectives because the proposed devices have been too complicated, bulky, inaccurate, or impracticable in use and operation.

The aforesaid objectives (and others that will occur to the artisan familiar with this art) are accomplished by providing an instrument comprised of a novel combination of three unique parts, namely: a magnetic support element, an optical member and a marking punch. Briefly described, the magnetic support is in the form of a strongly magnetized metal sleeve having a central bore of a size to receive and rotatably support the optical locating member perpendicular to the surface of the work. By virtue of the magnetic attraction between work and support, the latter is held in relatively fixed but movable relation to the work surface. The optical member, which is employed to accurately locate the support element, includes a lens system and a reticle with a cross hair or equivalent construction; light admission and directing means are incorporated in this member to facilitate proper posiitoning of the member and the support element on the work. The third part consists of a cylindrical marking punch adapted to be supported by the first described support upon removal of the optical member; this punch is provided with a hardened penetrating point that lies in the same locus as the intersection of the optical cross hairs. Thus it will be seen that the optical member is inserted in the support to enable accurate location of the assembly and that thereafter without disturbing the position of the support, the punch is substituted for the optical unit and used to impress a drill starting point at the appropriate point in the work surface.

As will be apparent in the disclosure which follows, my invention provides an instrument which is capable of use on work areas of limited extent and in regions of close quarters which would be inaccessible to the devices now in existence. Furthermore, as will be shown, my device is capable of use on curved surfaces.

In the accompanying drawings, structure has been disclosed that is designed to clearly carry out the various objects of the invention, but it is to be understood that the invention is not confined to the exact features disclosed, as various changes may be made within the scope of the claims which follow:

FIG. 1 is a side elevational view, partly in section, illustrating the magnetic support element resting on a work surface.

FIG. 2 is a similar view with the optical locating member in operative position and supported by the magnetic element.

FIG. 3 is a similar view with the optical member removed and the marking punch substituted therefor.

FIG. 4 is a top plan view of the magnetic support shown in FIG. 1.

FIG. 5 is also a plan view, partly in section, taken along line V—V of FIG. 2.

FIG. 6 is a view illustrating somewhat diagrammatically the magnetic field that is responsible for the force of attraction between the magnetic support and the work piece.

FIG. 7 illustrates an exploded view of the preferred form of the optical member showing its component parts.

FIG. 12 is a fragmentary plan view to illustrate in schematic fashion the operator's view through the sight opening of the optical member and the rotatability of this member when in operative position.

FIG. 13 is a detail view of the reticle showing the cross hair formation on an exaggerated or magnified scale.

Figure 10:
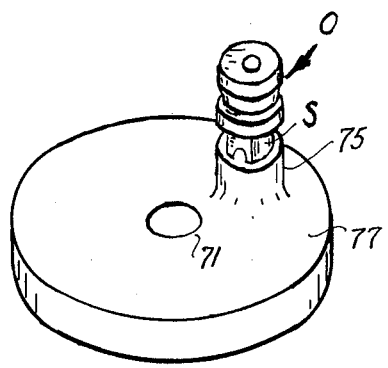
FIG. 10 illustrates the application of use when the working area is limited, herein shown at the top surface of a boss.

I will now describe the construction of the preferred embodiment of my device and give an explanation of the several variants in design that are contemplated, without, however, intending that this description shall limit the scope of my invention to other than that defined in the appended claims.

As stated above this invention is comprised of three essential parts, viz: a support element S, an optical member O and a punch member M.

The support element, S consists of a solid cast unitary body 1 of a highly magnetizable material such as that known in the trade as "Alnico V." This is an alloy of aluminum, nickel and cobalt that has been found to be highly magnetizable and to have the added quality of retaining that magnetism to a high degree. In the form shown in the drawings, the support S is cylindrical in shape and has a lower face 3 ground flat and at right angles to the axis A of the cylinder S. A notch 4 is cast diametrically across face 3 to divide it into two separate legs 5 and 6. These legs are adapted to lie on the surface of the work piece W. The support S is magnetized in such manner as to make one leg or pole face 5 a North magnetic pole and the other leg 6 the corresponding South magnetic pole as illustrated in FIG. 6. Thus when the support S is brought into proximity with a paramagnetic material such as steel, it is attracted thereto as shown in FIG. 6. While it is possible to so highly magnetize the support S that it is held to the surface W with considerable force, nonetheless the support is designed of such size that it can be moved againts the magnetic attractive forces to any desired location on the work surface. To facilitate handling the support S, and also to enable that element to be brought close to abutments (as will be further pointed out later), a flat 7 is cast on the outer surface 2 as shown in FIGS. 1 and 4. The support S is further provided with a central opening 8 that is bored out along an axis A perpendicular to the plane of the pole faces 5 and 6. Opening 8 is accurately ground to a uniform diameter and has a hard, wear-resistant wall surface.

The second part of my invention is called the optical member or optical locating head O, best illustrated in FIG. 7. In the preferred embodiment, this optical member O consists of several sub-parts including a pilot P, a body B and a cap C. The function of the optical member O is to assist the operator in accurately locating the support element S over a point on the workpiece W that is to be marked for subsequent drilling or other machine work. To this end, the member O is devised to be supported through its pilot part P in the aforesaid bore 8 of the support S. The pilot carries an indexing means for determining the location of the assembly—herein in the form of a cross hair arrangement. Body B serves the purpose of facilitating manipulation of pilot part P, provides a means for illuminating the pilot indicating or indexing means, and also serves to provide an optical magnifying system for viewing the indexing means. These parts will now be described.

The pilot P is preferably a hollow cylindrical screw machine part having a lower or tubular portion 21 with an outside diameter 25 that enables it to closely fit the bore 8 of support S. This lower tube 21 has a length in excess of the height of the support S and terminates at its upper end in an outwardly and upwardly flanged portion 22 that is threaded on the inside as shown at 23. An internal bore 24 is machined along the axis of the tube or sleeve. Preferably this bore has a polished surface to assist in reflecting light onto the reticle 27. The lower end of the bore 24 is counterbored at 26 in exact concentric relation with the outer cylindrical surface 25, to provide a seat for the aforesaid reticle 27. Reticle 27 is in the form of a circular disc, on the undersurface of which is accurately scribed a cross hair or similar formation 28 with the intersection I thereof coinciding with the axis of tube 21 when the disc is fitted in the seat 26; this reticle 27 comprises an index means, the optical center of which coincides with the aforesaid intersection I. This reticle 27 may be pressed into counter bore 26, or cemented in place, or the lower end of the sleeve 21 spun or upset as at 29, to clamp the reticle in position (FIG. 2). I have found that the reticle 27 is best made from a clear plastic material. This enables one to cut the cross hairs 28 into the lower surface (as best shown in FIG. 13). The cross hairs are not painted or otherwise filled, nevertheless, they appear clearly visible when sighted through the instrument, as discussed below. The fact that the cross hairs are not filled or painted accounts for the optical phenomenon that distinctly assists in determining the exact alignment of such reticle marks 28 with the layout lines L on the work piece, as described further infra. The upper end of the internal bore 24 below the flange 22, is flared at 20 to facilitate reflection of light into the pilot tube 24 as will be explained in further detail as this description proceeds.

The body portion B is preferably fabricated from a light transmitting material such as glass, clear plastic or the like. The principal purposes of the body B are (1) to provide a means for manipulating the pilot P; (2) to transmit light for viewing the reticle 27; and (3) to support a magnifying lens, 31. The body B is generally cylindrical in shape and has a reentrant circumferential notch 32 running about the peripheral wall 33. This notch 32 is designed to capture light rays R and direct them downward into the pilot tube 21. Extending the full length of the body B is an internal axial opening 35 having a larger diameter than that of the tubular bore 24. A threaded boss 36 projects from the lower surface of the body B and it is to this boss that the threaded flange 23 of the pilot tube P is removably attached. A seat 37 is formed in the upper surface of the body B and it receives a magnifying lens or eyepiece 31 held in place by the cap C which is threaded as at 41 onto the top of the body B as shown at 38. This cap has a central opening 40 that completes the formation of a sight tube which extends axially through the several parts when assembled as shown in FIG. 2. The size of opening 40 is reasonably restricted to prevent the operator from viewing the reticle at wide angle; thus parallax is avoided. The magnification of lens 31 is of the order of 3 to 5x which produces a clearly and easily visible image.

Whereas the light gathering notch 32 has been described as a circumferential cut-out it may take other forms; such forms would include a different angular relationship for the faces 32a and 36b (FIG. 7), or the notch might be discontinuous, or more than one employed. In the preferred embodiment, as described, the optimum lighting effect is obtained when the lower face 32a is disposed about 30° with horizontal and the upper face 32b forms an angle of 90° with face 32a. The principal object of the notch is to get light down into the sight tube 24 so that the reticle 27 and the work surface below it are readily visible. To assist in the reflection of light into the tube 24 the upper end thereof has been flared at 20 as previously described.

The third part of the invention is the marking device or punch M. In the form described this punch is a cylindrical piece having a carefully dimensioned and ground outside wall 50 of a diameter that will closely fit the bore 8 in support S. To this end, the diameter of the punch M is made essentially the same as that of pilot P. A hardened piercing point 51 is formed on the lower end of the punch and accurately located on the axis thereof so that when the punch M is inserted, the apex of the point 51 will lie on the same axial line (A) as occupied previously by the intersection of the reticle cross hairs 28. The top end of the punch M constitutes a striking surface 52 which is hit by a hammer to drive the point 51 into the work surface to form the drill starting impression.

One of the principal advantages of my device is that it is convenient to use and is capable of use in places on work pieces that would not be accessible to known devices of this general character. Reference to FIG. 10 will illustrate an instance wherein the drill point is to be set on a boss 75 of limited area in given spaced relation to an opening, 76 in a piece 77. My device lends itself admirably to use in this instance for the reason that it requires only a small area for its support, and even though the layout lines may be very short, they serve to accurately position the device; this is so because all that is used as a guide in aligning the punch is that exact point at which the mark is to be made and the layout lines immediately adjacent thereto, so that the layout lines can be short.

Figure 11:
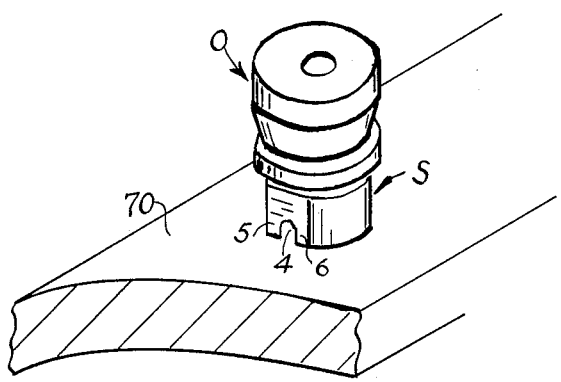
FIG. 11 shows my device in use on a curved surface.

Another instance illustrating the versatility of my device is shown in FIG. 11 wherein it is being used on a convex surface 70—herein a pipe section—to locate a drill starting mark. In this instance the support S is positioned with the notch 4 lying in the direction of the axis of the pipe and the pole pieces 5 and 6 straddling the pipe curvature. Magnetic attraction holds the support on the pipe 70 in this instance, just as it does when a flat surface is involved.

Figure 8:
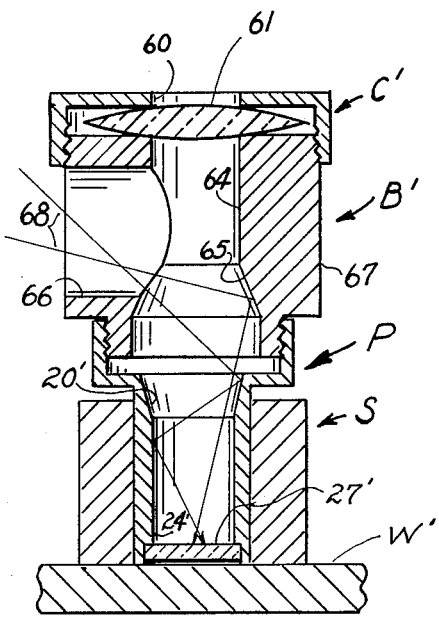
FIG. 8 illustrates a modified form of the invention.

Whereas the foregoing description relates to an optical member O having a transparent body portion, it is also within the scope of the invention to fabricate such part from metal or other opaque material and provide novel light admitting openings through such body. One form of such modification is illustrated in FIG. 8 wherein it is shown associated with the form of pilot tube P previously described. Here the body B' has a central sight opening 64 extending vertically along its central axis and terminating at the lower end in a bell shaped opening 65. A light admitting opening 66 extends horizontally from the peripheral wall 67 to the sight opening 64. Rays of light 68 from a source not shown (but which would normally be a tool marker's bench lamp or the like) enter the opening 66 and are reflected into the pilot tube 24' and onto the reticle 27'. This illustration also serves to explain the purpose of the flared portion 20' at the upper end of the pilot tube bore; it will be seen that such flaring tends to permit the passage of light that might otherwise be cut off by a projecting rim; furthermore such angularly-oriented surface 20' tends to reflect light into the lower tubular portion as shown. This embodiment has a cap C' with an eyepiece opening 60 that holds the eyepiece lens 61 in place at the top of the body B'.

Figure 9:
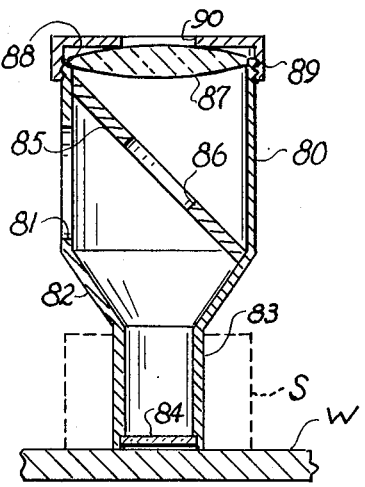
FIG. 9 illustrates a further modified form of the invention.

A further modified form of optical member is illustrated schematically in FIG. 9. In this embodiment, the body and pilot sub-parts are combined into a unitary, hollow structure. The body wall 80 is provided with a light admitting opening 81, and terminates in a tapered lower portion 82 from which depends a tubular pilot portion 83 carrying at its lower extremity a reticle 84 corresponding in form and function to the reticle of the preferred embodiment. To further assist in directing light into the pilot tube, this variant contains an angularly placed reflector 85. Such reflector is shown in the form of a mirror element supported opposite the light opening 81 and having a sight opening 86. The function of the tapered wall 82 is similar to that of the corresponding element 29 of the preferred embodiment, FIGS. 2 and 7. It is possible to eliminate the opening 86 if the reflecting element 85 is constructed of transparent material. At the upper end of the body 80 an eyepiece lens 87 is held in a slot 88 by cap 89 which in turn has an eyepiece opening 90. The modification is, of course, employed with the support S, previously described.

Operation and use of the invention may be described as follows:

The operator makes his layout for the hole pattern on the workpiece W using standard tools such as the combination square, dividers, scriber, vernier height gage or other instruments common to the tool and die trade. Ordinarily this layout will entail use of layout paint or stain into which the layout lines L are scribed. These layout lines are shown and identified by the reference character L of FIGS. 4 and 12, it being desired that the point to be marked and subsequently drilled, be the intersection of these layout lines.

Next, the magnetic support S is placed on the work surface with the pole faces 5 and 6 lying against the work; the support is placed so that the axis of its bore 8 lies approximately over the intersection of layout lines L. It will be noted that the notch 4 permits entrance of light to assist in locating the support S. This support will be held firmly against the surface W by the magnetic attractive force between it and the work as best shown in FIG. 6.

With the support in place, the optical member O is inserted into the bore 8 and brought to rest on the surface of the work W. The operator then sights into the eyepiece opening 40 onto the reticle 27 at the surface of the work. At this time he sees the cross hairs 28 and the intersecting scribed lines L on the work surface. Ordinarily, the cross hairs and lines are out of register and to bring them together the operator shifts the position of the support S as necessary against the restraining magnet attractive force. When the two intersections (i.e. that of the reticle lines 28 (indicated at I) and that of the scribed lines) are approximately in register, the operator can rotate the optical element. He then continues adjustment of the support S until the intersections coincide (see FIG. 12) to bring the respective lines into parallel relationship. When exact superposition of the intersections occur the reticle lines appear to "snap" into alignment with the scribed lines. This is probably due to a form of interference phenomenon, but in any event it gives the operator a particularly accurate indication of when he has properly positioned the support S. In the event only one of the respective sets of lines fall into registry, then, of course, the operator has to move the support S in the direction of registering lines to effect the final necessary adjustment.

After the support S has been accurately located, as above, the optical member O is removed, and the marking punch M substituted. The point 51 of the marking punch M is designed to occupy the same space relationship with respect to the support S (namely, along the axis A of the bore 8) as did the intersection point I of the reticle cross hairs 28 previously occupying the support bore 8. Thus the point 51 of the punch M now lies exactly on the scribed line intersection and by striking the punch M at 52, a drill starting impression is formed in the surface W of the work piece.

Having thus described my invention it will be apparent that I have provided an important and useful instrument for accurately locating and marking a point on a work piece. It will be seen that my instrument is easy to use, accurate and compact. Further, it is uncomplicated and self-contained and is not subject to appreciable loss of accuracy due to wear or other normal hazards of use.

I claim as my invention:

1. An instrument for marking a point on the surface of a work piece, comprising a unitary support having a face adapted to lie upon the work surface, a longitudinal bore extending through the support perpendicular to its face, said bore having an axis in fixed space relation with respect to the support, an optical member adapted to be removably received in the support bore and rotatable on the axis of the bore, a reticle carried by the member proximate to the work surface, said member having light admission means comprising a reentrant circumferential notch to illuminate the reticle and a restricted sight opening to enable an operator to sight simultaneously on the reticle and on the surface of the work piece in order to align the reticle and support with a predetermined locus point on the work surface, a marking punch slidably fitting the support bore when the optical unit is removed and having a marking point at its lower end in the same space relationship with respect to the support bore as has the reticle; said punch having a striking portion which when struck will cause the marking point to be driven into the surface of the work piece.

2. A device as described in claim 1 wherein the work surface is provided with intersecting scribed lines to designate a desired marking locus and the optical element is rotatable about the axis of the bore in the support to facilitate determination of coincidence of the cross hairs with the scribed lines on the work.

3. An instrument for locating and marking a drill point on the surface of a work piece comprising a magnetic support having a face adapted to lie upon and be attracted to the work surface with a force sufficient to normally hold the support in place while permitting desired movement of the support against the attractive force, a longitudinal bore extending through the support perpendicular to its face, said bore having an axis in fixed space relation with respect to the support, an optical member having a pilot part and a body part, said pilot part adapted to be removably received in the support bore with its lower end resting on the work surface, a reticle carried at the lower end of the pilot proximate the work surface, the body part provided with light admission and transmitting means comprising a reentrant circumferential notch and surmounting the pilot part, the optical member being provided with aligned openings to enable an operator to sight simultaneously on the reticle and the surface of the work piece, the optical member capable of rotary motion on the axis of the bore to facilitate alignment of the reticle with a predetermined locus point on the work surface as the operator effects desired movement of the support and member, a cylindrical marking punch slidably fitting the support bore when the optical member is removed and having a marking point at its lower end that lies on the axis of the support, said punch having a striking portion extending above the support which when struck by a hammer will cause the marking point to be driven into the work surface.

4. An instrument for accurately locating and marking a drill starting point in a work piece surface at the intersection of layout marks thereon, comprising: a magnetic support having an axial bore therethrough oriented perpendicular to the work surface; an optical member including a hollow pilot portion surmounted by a body portion, the pilot portion adapted to be rotatably and slidably received by the bore of the support, a reticle carried by the pilot portion, including a cross hair configuration having the intersection thereof lying on the axis of the support bore and positioned proximate the surface of the work piece, the body portion being comprised of a light transmitting medium and having a reentrant circumferential notch through which light is directed down into the interior of the pilot portion and onto the cross hair, a sight opening extending through the optical member terminating at its upper end in a restricted opening, a magnifying lens seated in the upper part of the body portion and a cap over said lens with a central opening that forms the upper terminus of the sight opening; and a marking punch adapted to closely fit the support bore and having a marking point that lies on the axis of the bore, whereby upon inserting the optical member and viewing through the sight opening thereof an operator can adjust the position of the support until the intersection of the reticle cross hairs appears to coincide with the intersection of the layout marks, whence the optical unit can be removed and the punch member inserted to mark that intersection point on the surface of the work piece by driving the marking point into the work surface at said intersection point.

5. A device as described in claim 3 wherein the magnetic support has a slot across the face to divide it into two legs, the support being so magnetized as to make one leg a north magnetic pole and the other a south magnetic pole.

6. A device as described in claim 5 wherein a flat surface is provided on the side of the support normal to the direction of the slot.

7. An instrument for locating and marking a drill point on the surface of a work piece, comprising a magnetic support element having a pair of spaced pole faces adapted to lie upon and be magnetically attracted to the work surface, a longitudinal bore extending axially thru the element and perpendicular to the plane of the work surface said bore having an axis in fixed space relation with respect to the support element, an optical member comprised of a lower pilot part surmounted by an upper body part, the pilot part adapted to be slidably and rotatably received in the aforesaid bore of the support with its lower end resting on the work surface, a reticle with a cross hair formation carried at the lower end of the pilot such that the cross hair intersection lies on the axis of the support bore when the pilot is inserted in the bore, the body part having reentrant circumferential notch means to admit light and direct it onto the reticle, a magnifying lens carried by the body part, a cap with a restricted central sight opening to hold the lens in position, the optical member being provided with aligned openings to enable an operator to view through the lens and to sight simultaneously on the cross hair and the surface of the work piece, a marking punch receivable in the support bore when the optical unit is removed and having a marking point at its lower end that lies on the axis of the support bore when the punch is inserted therein, the marking punch having a longitudinal dimension greater than the height of the support so that the upper surface of the punch can be struck to drive the marking point into the work surface and form an impression in the work without disturbing the support member.

References Cited by the Examiner
UNITED STATES PATENTS

| | | | |
|---|---|---|---|
| 710,257 | 9/1902 | Leeuw | 33—189 X |
| 2,306,677 | 12/1942 | Ward. | |
| 2,818,655 | 1/1958 | Gaston | 33—189 |
| 2,861,484 | 11/1958 | Rance | 33—189 |
| 2,899,861 | 8/1959 | Ott | 88—39 |
| 2,934,829 | 5/1960 | Bohn | 33—189 |
| 3,068,573 | 12/1962 | Sidwell. | |
| 3,153,860 | 10/1964 | Sidlauskas | 33—189 |

ISAAC LISANN, *Primary Examiner.*

W. D. MARTIN, *Examiner.*